(12) United States Patent
Menard

(10) Patent No.: US 12,366,432 B2
(45) Date of Patent: Jul. 22, 2025

(54) ACTIVE AIRCRAFT VISUAL CLOAKING SYSTEM

(71) Applicant: Bell Textron Inc., Fort Worth, TX (US)

(72) Inventor: Adam S. Menard, Aledo, TX (US)

(73) Assignee: Textron Innovations Inc., Providence, RI (US)

( * ) Notice: Subject to any disclaimer, the term of this patent is extended or adjusted under 35 U.S.C. 154(b) by 917 days.

(21) Appl. No.: 17/161,075

(22) Filed: Jan. 28, 2021

(65) Prior Publication Data

US 2022/0234713 A1 Jul. 28, 2022

(51) Int. Cl.
| | |
|---|---|
| *F41H 3/00* | (2006.01) |
| *B64C 1/00* | (2006.01) |
| *B64D 7/00* | (2006.01) |
| *B64D 47/08* | (2006.01) |
| *H04N 7/18* | (2006.01) |

(52) U.S. Cl.
CPC ............... *F41H 3/00* (2013.01); *B64C 1/00* (2013.01); *B64D 7/00* (2013.01); *B64D 47/08* (2013.01); *H04N 7/18* (2013.01)

(58) Field of Classification Search
CPC ............... F41H 3/00; B64D 7/00; H04N 7/18
USPC ........................................................... 348/61
See application file for complete search history.

(56) References Cited

U.S. PATENT DOCUMENTS

| | | | |
|---|---|---|---|
| 7,088,039 B2 | 8/2006 | Barnardo et al. | |
| 7,645,177 B2 | 1/2010 | Kwasny | |
| 8,470,388 B1 * | 6/2013 | Zsinko | H05B 33/10 |
| | | | 427/64 |
| 9,642,212 B1 * | 5/2017 | Rogers | C09D 175/04 |
| 2007/0042139 A1 | 2/2007 | Cooper et al. | |
| 2010/0288116 A1 * | 11/2010 | Cincotti | F41H 3/00 |
| | | | 89/938 |
| 2011/0095692 A1 * | 4/2011 | Laycock | F41H 3/00 |
| | | | 313/498 |
| 2018/0267382 A1 * | 9/2018 | Kwon | H04N 23/11 |
| 2020/0192623 A1 * | 6/2020 | Oughourlian | G06F 3/1446 |

FOREIGN PATENT DOCUMENTS

| | | | | |
|---|---|---|---|---|
| CN | 103101624 A | * | 5/2013 | |
| FR | 3002206 A1 | * | 8/2014 | ............ A01M 29/10 |
| JP | 2004259572 A | | 9/2004 | |
| WO | WO-2009138785 A1 | * | 11/2009 | ............... B63G 8/34 |

OTHER PUBLICATIONS

"Visibility Studies and Some Applications in the Field of Camouflage", Office of Scientific Research and Development, NDRC, Washington, D.C., 1946, 299 pages, vol. 2, U.S.

* cited by examiner

*Primary Examiner* — James T Boylan
(74) *Attorney, Agent, or Firm* — Frost Brown Todd LLP

(57) ABSTRACT

A cloaking system for an aircraft is provided. Cameras on the aircraft can detect background colors during flight. Electroluminescent paint on the aircraft can be powered on that resembles the background color. The color and luminescence of the aircraft will allow for dynamic cloaking unachievable by prior art camouflage paint colors.

4 Claims, 7 Drawing Sheets

ACTIVE AIRCRAFT VISUAL CLOAKING SYSTEM

TECHNICAL FIELD

The present disclosure is directed to aircraft design and more particularly to aircraft cloaking technology.

BACKGROUND OF THE INVENTION

It is common for aircraft to be painted in camouflage paint patterns. Colors such as black, green, grey, olive drab, and brown are common. But these colors and paint schemes are not always ideal. There are many tactical situations where colors such as brown or green do not assist in hiding an aircraft. A single aircraft may also be used in various tactical situations over its lifetime, and each situation may have different camouflage needs. Appropriate camouflage for one mission may not work for a different mission.

BRIEF SUMMARY OF THE INVENTION

One embodiment of the present disclosure comprises a cloaking system for an aircraft. The cloaking system can comprise one or more cameras configured to detect a background color; one or more electroluminescent paint patterns comprising one or more shapes comprising one or more colors; and one or more power sources coupled to the one or more electroluminescent paint patterns. It can further comprise a processor coupled to the one or more cameras and the one or more power sources; wherein when the one or more cameras detects a background color, the processor is configured to activate the one or more power sources to cause the one or more electroluminescent paint patterns to luminesce in at least one of the one or more colors that is similar to the background color.

Another embodiment under the present disclosure can comprise a method of manufacturing an aircraft. This method can comprise providing an aircraft body; attaching one or more cameras to the aircraft body; applying one or more electroluminescent paints to the aircraft body; connecting a power source to the one or more electroluminescent paints; and coupling a processor to the one or more cameras, the one or more electroluminescent paints, and the power source, such that the processor is operable to detect color by the one or more cameras and to activate the one or more electroluminescent paints to cause the aircraft to resemble the detected color.

Another embodiment under the present disclosure can comprise a cloaking system for an aircraft. This system can comprise a first electroluminescent paint pattern applied to at least a portion of a first side of the aircraft, the first electroluminescent paint pattern comprising a first, second and third color wherein the first, second and third colors can be powered independently of each other; a second electroluminescent paint pattern applied to at least a portion of a second side of the aircraft, the second electroluminescent paint pattern comprising the first, second and third color wherein the first, second and third colors can be powered independently of each other; a first camera configured to detect a first background color in the sky on the first side of the aircraft; and a second camera configure to detect a second background color in the sky on the second side of the aircraft. It can further comprise one or more power sources configured to supply power to the first and second electroluminescent paint patterns; and a processor coupled to the first and second electroluminescent paint patterns, the first and second cameras, and the one or more power sources, the processor configured to receive a notification of the first background color on the first side and to adjust the second electroluminescent paint pattern to resemble the first background color, the processor further configured to receive a notification of the second background color on the second side and to adjust the first electroluminescent paint pattern to resemble the second background color.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Many current camouflage colors or designs for aircraft make use of brown, green, grey and black colors in traditional camouflage patterns. These designs can be effective for low altitude flying against backgrounds of forests and mountains. But these designs are less effective during high altitude flight or other situations. When the sky is the background, traditional camouflage can make an aircraft stand out rather than blend in. Furthermore, the luminescence of the sky can conflict with the flat colors of traditional camouflage. To address these challenges, the applicant has developed the application of paramagnetic or electroluminescent paint or coatings to aircraft. The application of such paint or coatings, in various stripe or pattern designs, can allow an aircraft to vary its appearance, color, and luminescence in response to changing situations. A plurality of cameras on an aircraft can allow the aircraft to detect a background color to match for maximum effect.

References are made herein to paramagnetic paint, luminescent paint, and electroluminescent paint. While there may be some differences in the functionality of these types of paint, they are used interchangeably herein. The present disclosure covers various types of luminescent paint and these terms are used to refer to any broad range of luminescent paint technologies and capabilities.

Figure 1:
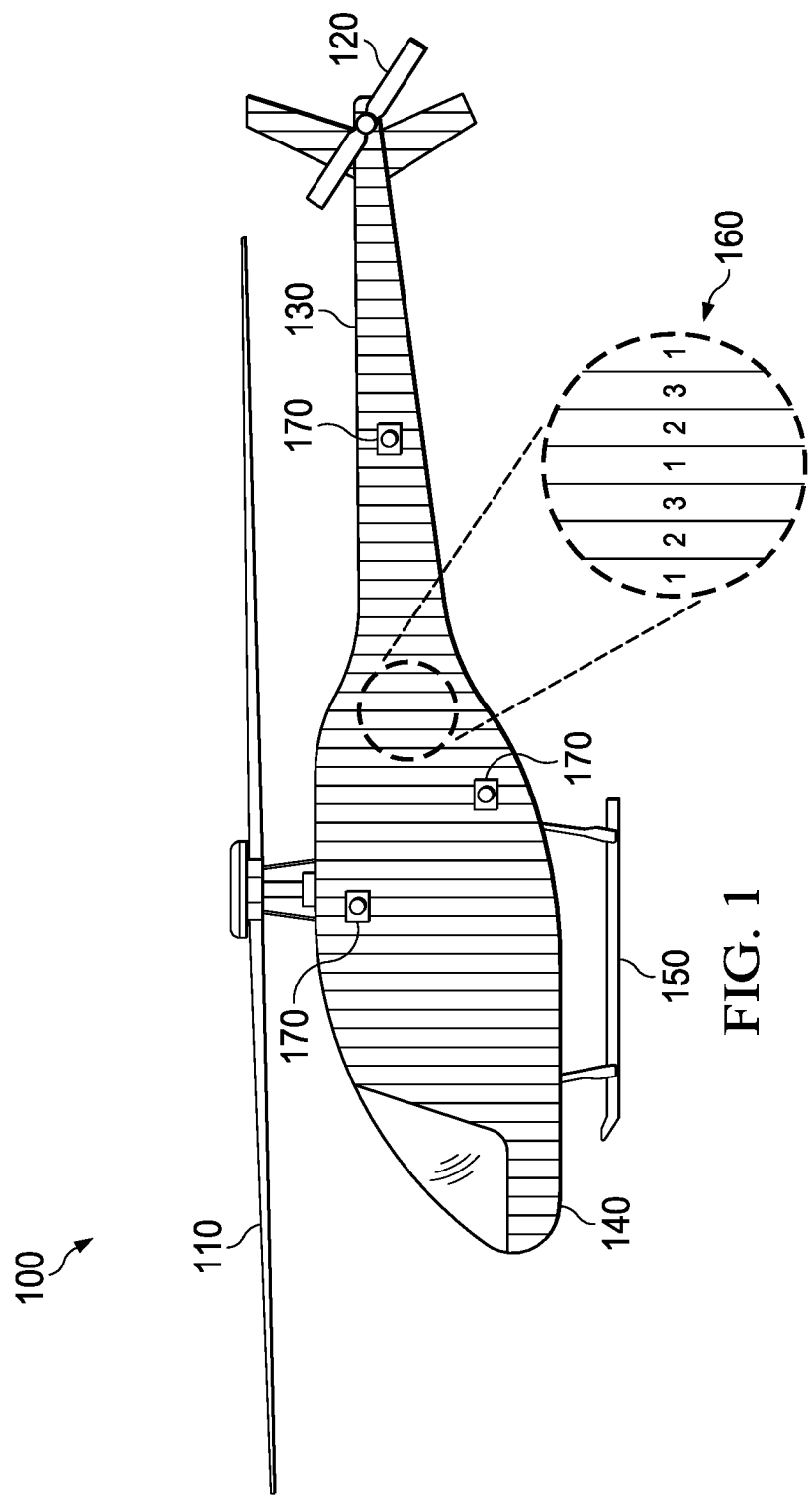
FIG. 1 is a schematic view of an aircraft embodiment under the present disclosure.

Referring now to FIG. 1, a helicopter embodiment under the current disclosure can be seen. Helicopter 100 comprises rotor 110, tail rotor 120, landing skids 150, cockpit 140, tail boom 130, cameras 170, and paint pattern 160. Paint pattern 160 can comprise a repeating set of three colors. Pattern 160 can comprise paramagnetic (or electroluminescent) paint. When a power source supplies power to the paint, it can luminesce and/or change color. In the embodiment of FIG. 1, color 1 could be blue, color 2 could be grey, and color 3 could be white in their luminescent states. When the paramagnetic paint is unpowered, helicopter 100 may appear to approximately be the same color across its body, though some variation may be visible. One or more cameras 170 may be disposed on various sides or surfaces of the helicopter 100. The colors detected by a camera 170 will generally determine the luminescence and color of the pattern 160 on the opposite side (not shown) of helicopter 100. If a camera 170 on the unseen side of helicopter 110 detects a blue sky, then pattern 160 can be set to supply power to color 1, causing a luminescent blue color. The other colors may remain unpowered. Lighting the blue stripes of pattern 160 along one or more sides of helicopter 100 can cause the helicopter 100 to camouflage itself against a blue sky. In different situations, colors 2 or 3 may be used. A cloudy sky may lead to the use of the white and gray paramagnetic portions. Combinations of colors may also be used to adjust the overall appearance of an aircraft.

Figure 2:
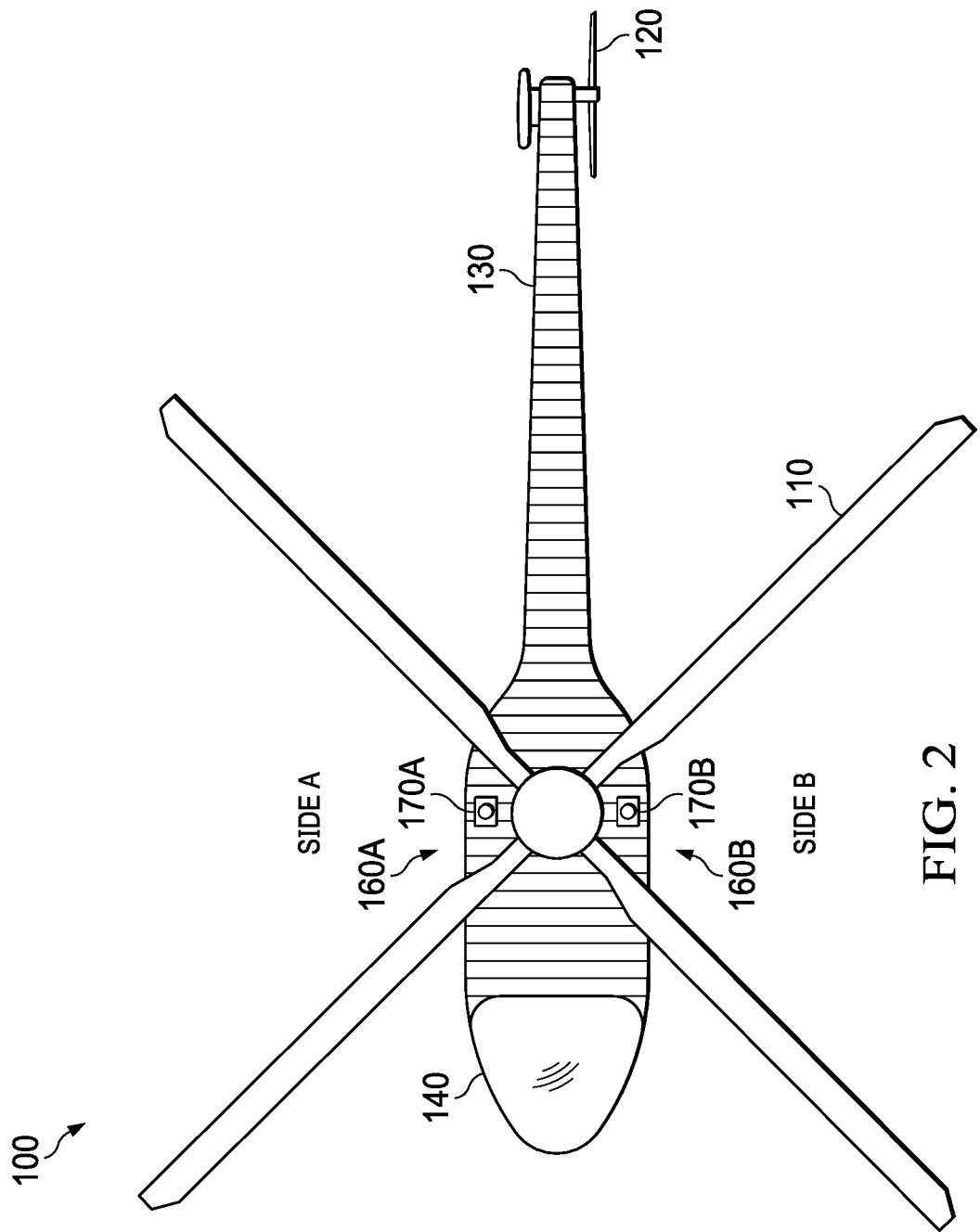
FIG. 2 is a schematic view of an aircraft embodiment under the present disclosure.

FIG. 2 shows a top-down view of the helicopter 100 embodiment of FIG. 1. As seen in FIG. 2, side A comprises camera 170A and pattern 160A, while side B comprises camera 170B and pattern 160B. Pattern 160A may comprise the same series of colors as pattern 160B. The patterns can alternatively comprise different colors, different patterns, different size stripes, or any appropriate color, shape and size arrangement. During flight, camera 170B may detect color on side B. The color detected by camera 170B may be used to determine how power is supplied to pattern 160A. Similarly, the color detected by camera 170A may be used to determine how power is supplied to pattern 160B. In one possible example, helicopter 100 may be flying in an area with clouds on side B and clear skies on side A. Camera 170B can detect the white and gray colors of the clouds on side B and send a signal to a controller (not shown) for pattern 160A. The white and gray portions of pattern 160A can be adjusted and selected to match the detected clouds. Camera 170A can detect the blue sky on side A and send a signal to a controller (not shown) for pattern 160B. The blue portions of pattern 160B can be adjusted and selected to match the detected blue sky. White and gray portions of pattern 160B may be activated as well if it helps to adjust the brightness or quality of pattern 160B. In these conditions, helicopter 100 can be camouflaged to viewers on both sides.

Figure 3:
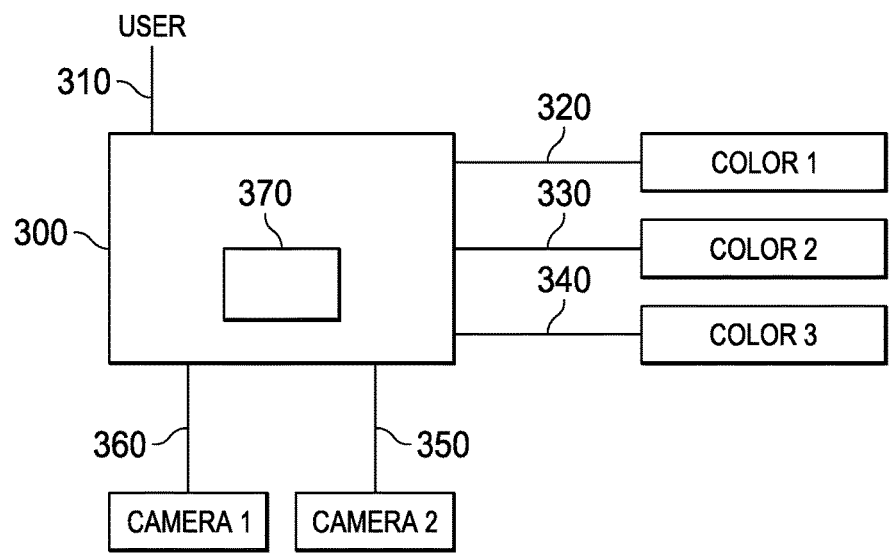
FIG. 3 is a view of a circuit embodiment under the present disclosure.

FIG. 3 displays an embodiment of a controller 300 under the present disclosure. Controller 300 can comprise a portion of an onboard computer of an aircraft, or separate circuitry. Controller 300 can comprise connections 360, 350 to one or more cameras (camera 1, camera 2) such as cameras 170, 170A, 170B in FIGS. 1 and 2. Controller can comprise a power source 370 that can comprise a connection to a power source of the aircraft or an independent battery or other power source. Connection 310 provides communication between the user (pilot/crew or remote users in the case of unmanned aircraft) and the controller. Connection 310 can provide uni- or bi-directional communication. Connections 320, 330, 340 allow the controller 300 to interact with and control colors 1, 2, and 3 that can comprise paramagnetic paint, such as in patterns 160, 160A, and 160B from FIGS. 1 and 2. More colors, and thus more connections, can be used according to user preference or benefit. Connections 320, 330, 340 can carry power to the paramagnetic colors 1, 2, and 3, causing them to activate and luminesce. Controller 300 can be configured to automatically activate or adjust colors 1, 2, and 3 when cameras 1 and 2 detect certain colors. Alternatively, user input via connection 310 may be necessary in some cases, or users may control colors 1, 2, and 3 directly when preferred.

Any number of colors, and connections to colors, may be used. Paramagnetic paint of color 1 may be disposed at various places on an aircraft. All of the patches or portions of color 1 may be able to share an input and power supply in some embodiments. In other embodiments, each individual patch of color 1 may require its own connection to controller 300 or power supply. In some embodiments, each patch of color, or each color, may have its own power source independent from other paramagnetic paint colors.

Figure 4:
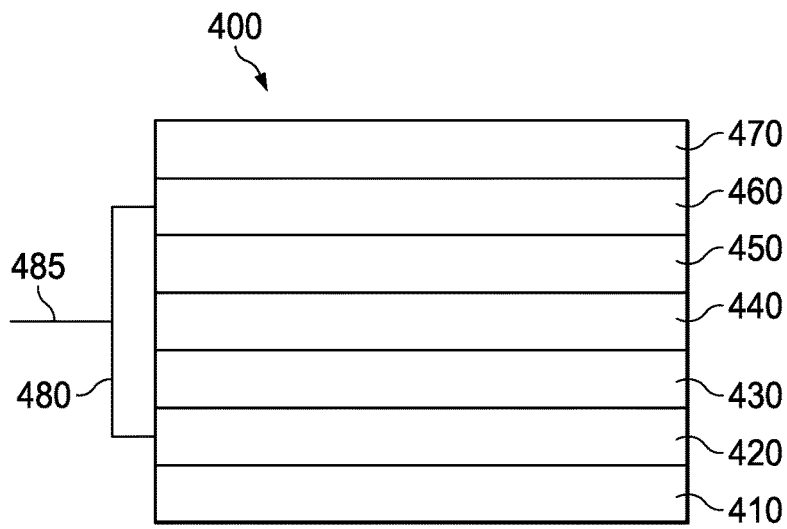
FIG. 4 is a view of a luminescent paint embodiment under the present disclosure.

FIG. 4 displays a possible embodiment of layers of paramagnetic or electroluminescent paint 400. The bottom layer comprises a substrate 410. In embodiments under the present disclosure a substrate 410 can often be the body of an aircraft. Above substrate 410, a primer 420 can be applied. Above that, a conductive backplane 430 can be applied. Next can be a dielectric 440 and phosphor 450. Above that can be applied a conductive clear layer 460 followed by a clear coat 470 that can seal the layers below. A charge can be applied to the backplane 430 and the conductive clear layer 460 via input(s) 485. The dielectric layer 440 helps to spread the electric charge evenly across the paint 400. As current is applied an electric field is created, causing the phosphor 450 to emit light.

Figure 5:
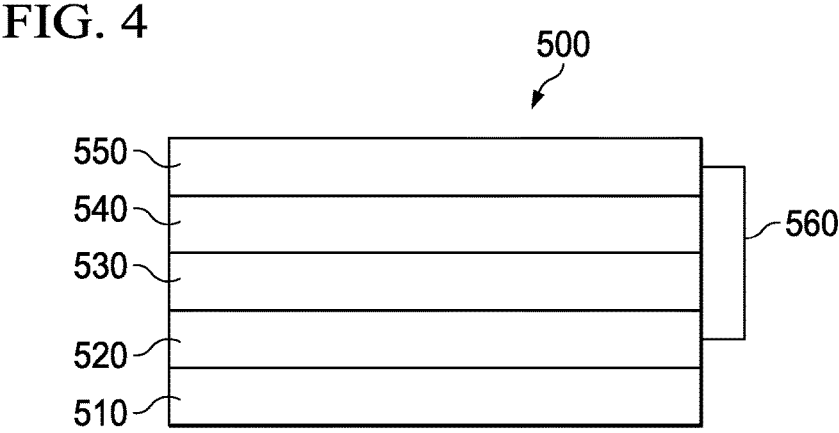
FIG. 5 is a view of a luminescent paint embodiment under the present disclosure.

FIG. 5 displays another possible embodiment of paramagnetic or electroluminescent paint 500. Substrate 510 can comprise the surface of an aircraft. Above substrate 510 can sit a conductive primary layer 520. Above that can sit a first middle layer 530, then a second middle layer 540, and finally a conductive outer layer 550. Conductive outer layer 550 is preferably clear to allow emitted light to pass through, but other colors or means for shading the emitted light are possible. A/C power signal is applied to the conductive primary layer 520 and the conductive outer layer 550. The first middle layer 530 can be used to insulate the conductive layers from each other. The second middle layer 540 typically comprises electroluminescent pigment. In some embodiments the first middle layer 530 and second middle layer 540 can comprise a single layer.

Embodiments of paramagnetic or electroluminescent paint under this disclosure, such as in FIGS. 4 and 5, can utilize the teachings of U.S. Pat. No. 9,642,212 B1, titled "Electroluminescent System and Process," and U.S. Pat. No. 8,470,388 B1, titled "Electroluminescent Devices and Their Manufacture." These references are herein incorporated by reference.

Figure 6:
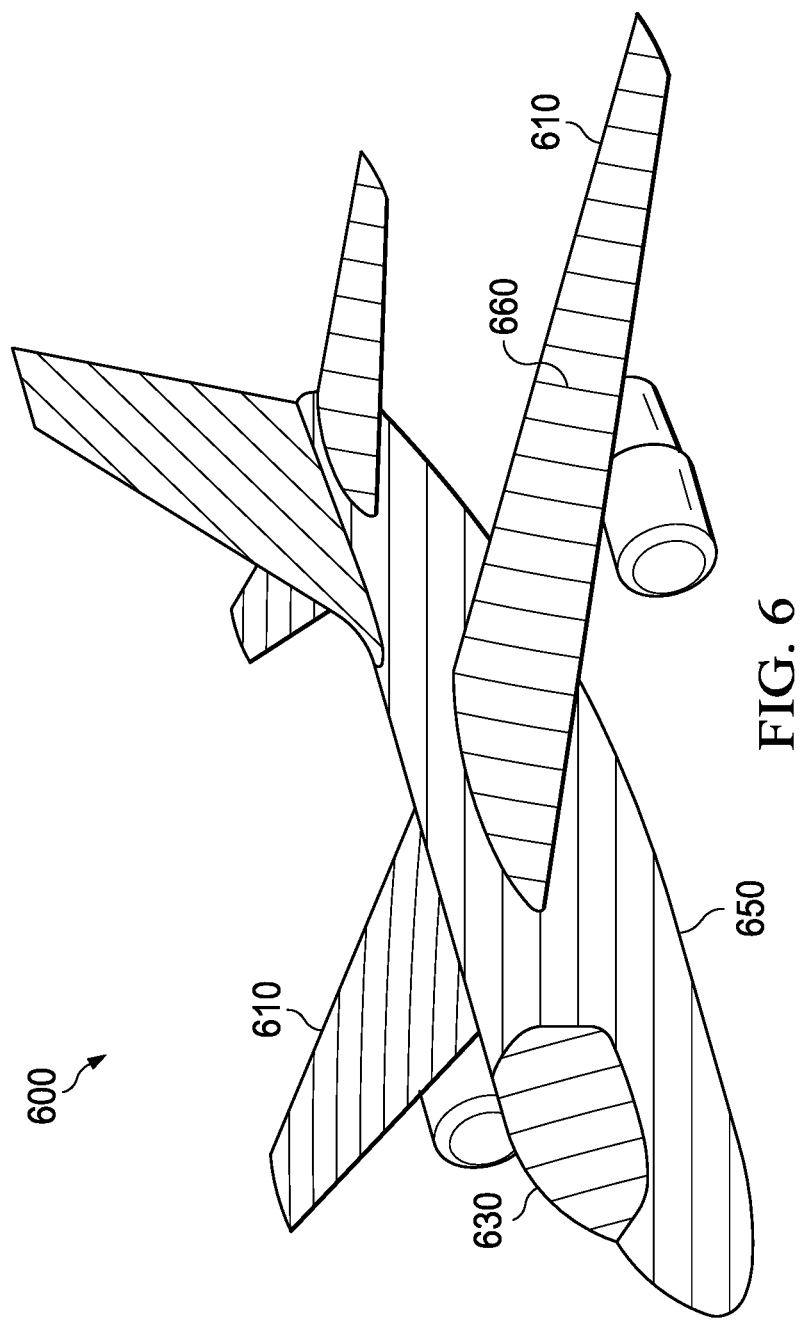
FIG. 6 is a schematic view of an aircraft embodiment under the present disclosure.

Reference has been made to a helicopter as a possible aircraft embodiment under the current disclosure. However, any vehicle or aircraft can utilize the teachings of the current disclosure. FIG. 6 shows a possible embodiment of an airplane 600. Airplane 600 comprises cockpit 630, body 650, and wings 610. Electroluminescent paint pattern 660 can comprise all, a portion, or substantially all of the exterior surface of airplane 600. Horizontal stripes are shown on the fuselage of airplane 600 in FIG. 6, but any design or arrangement is possible. Different sides or portions of plane 600 may comprise different shapes, colors, or patterns of electroluminescent paint. Furthermore, electroluminescent paint can be used on glass, windows, or other similar parts of airplane 600.

Figure 7:
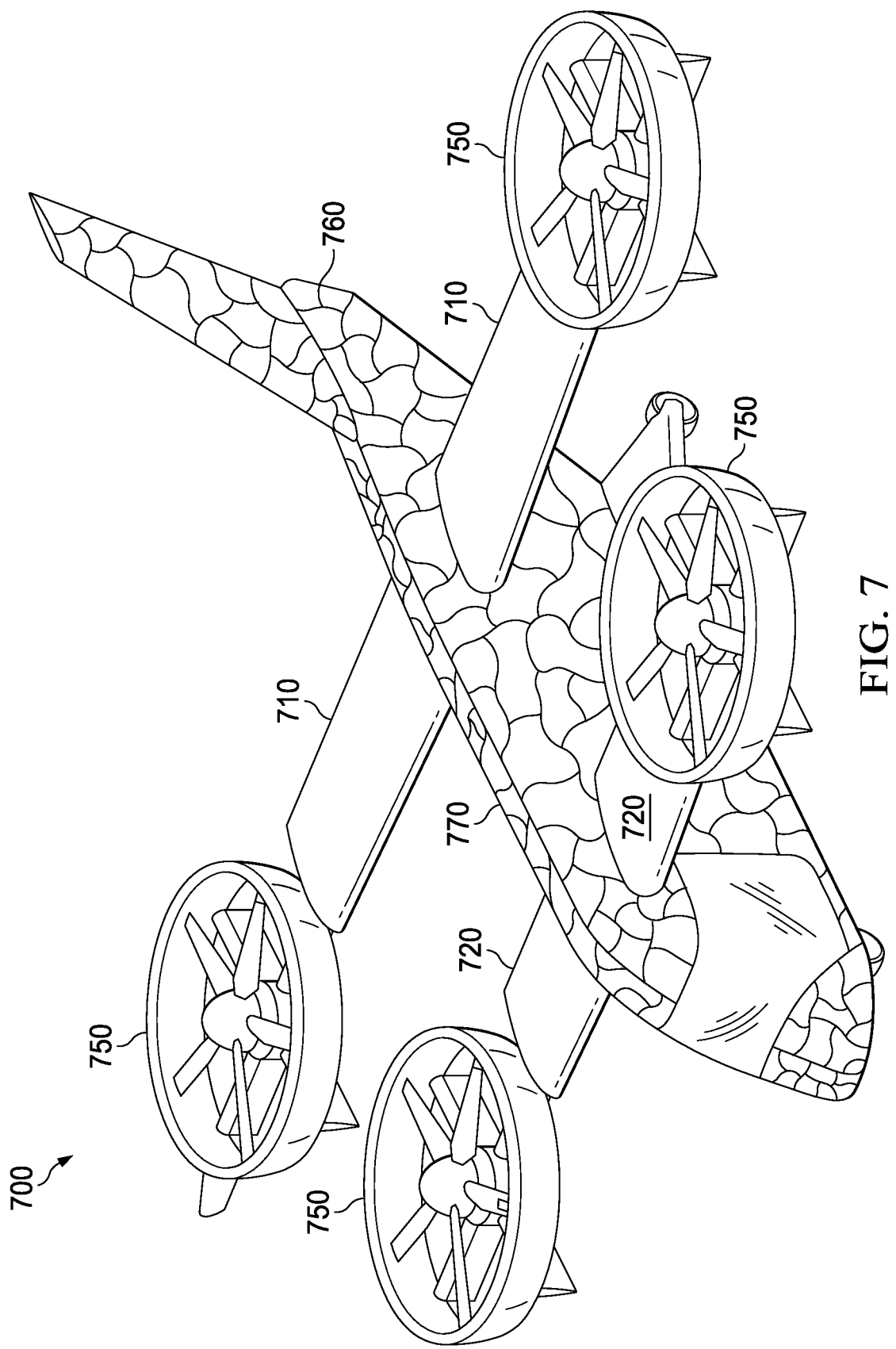
FIG. 7 is a schematic view of an aircraft embodiment under the present disclosure.

FIG. 7 shows a further embodiment of an aircraft 700 under the present disclosure. Aircraft 700 comprises an electric vertical takeoff and landing vehicle. Aircraft 700 can comprise wings 710 and 720, rotors 750 and body 770. The surface of aircraft 700 can comprise a paint pattern 760 comprising electroluminescent paint. In this embodiment paint pattern 760 has a camouflage or more random pattern than the stripes shown in previous embodiments. Paint pattern 760 can comprise two or more colors. Paint pattern 760 can optionally cover part, all, a significant part of, or a small part of aircraft 700, including wings 710, 720, rotors 750, and any other comprising part of an aircraft.

Embodiments under the present disclosure can comprise any appropriate number of colors. Embodiments can also comprise any appropriate pattern such as stripes, blocks, camouflage shapes or any other pattern as desired by a user. In a preferred embodiment, the paint pattern comprises a repeating pattern of three color stripes: blue, gray and white. In this preferred embodiment each stripe measures between ½ inch and 1 inch. Such stripes can extend substantially around the body of the aircraft. However, as described, various implementations, colors, and patterns are possible.

Electroluminescent paint can be disposed anywhere desired on an aircraft. Generally, against a sky background (or water, if trying to hide from observers above the aircraft), luminescence helps in disguising an aircraft. Against ground or trees, luminescence is not as valuable and any luminescence may be turned off. An aircraft may, during a specific mission, want to blend in against a clear sky, against a cloudy sky, against a wooded mountainside, and against a cityscape. A pilot, or other operator or remote operator, may vary the colors chosen, and whether to luminesce, during the course of the mission.

Figure 8:
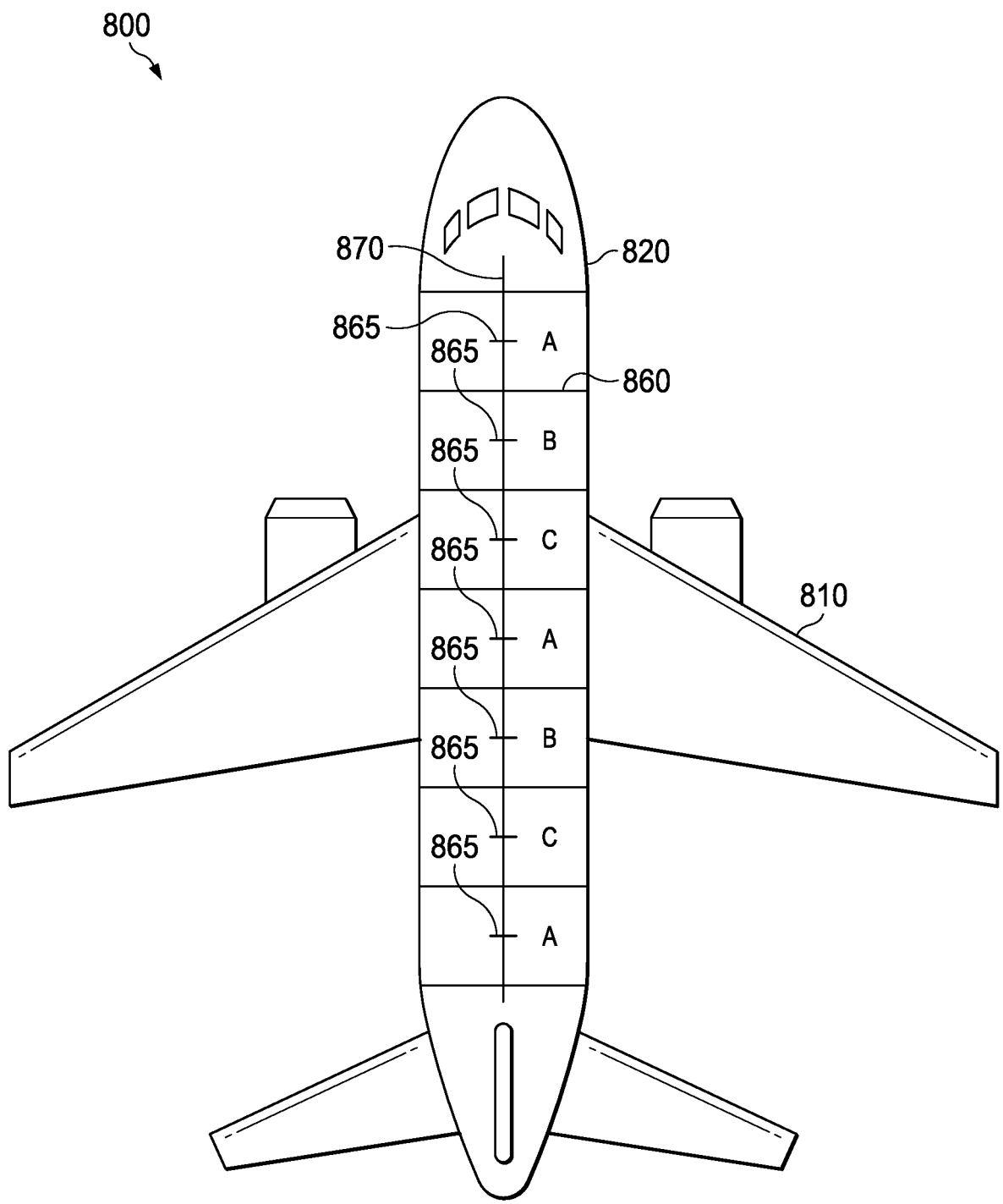
FIG. 8 is a schematic view of an aircraft embodiment under the present disclosure.

FIG. 8 shows a possible embodiment of electrical connections between a power source and paint pattern under the present embodiment. Aircraft 800 comprises body 820, wings 810, and paint pattern 860. Paint pattern 860 comprises repeating colors A, B, and C. At each stripe there is an electrical connection 865 providing AC power to the electroluminescent paint. In some embodiments connection 865 can comprise inputs to the appropriate conductive layers, such as in FIGS. 4 and 5. Power line 870 can provide power to the connections 865 from a power source such as a battery or engine of aircraft 800. Other embodiments of supplying power to the paint pattern are possible. For example, in some embodiments all of the stripes or shapes of a given color may intersect at some point on the aircraft, allowing one electrical connection per color. But some embodiments may require a multiplicity of electrical connections at various points around the aircraft.

Cameras under the present disclosure can comprise any appropriate camera or light sensitive device. Fiber optic cameras can be implanted into the surface of an aircraft, creating no aerodynamic drag. High resolution cameras are possible. In some embodiments, lower resolution may suffice as it may only be required to detect a general color of the sky or background. In some embodiments, a camera may not detect color itself, but will take a picture and send the picture to a processor that can detect the color.

Figure 9:
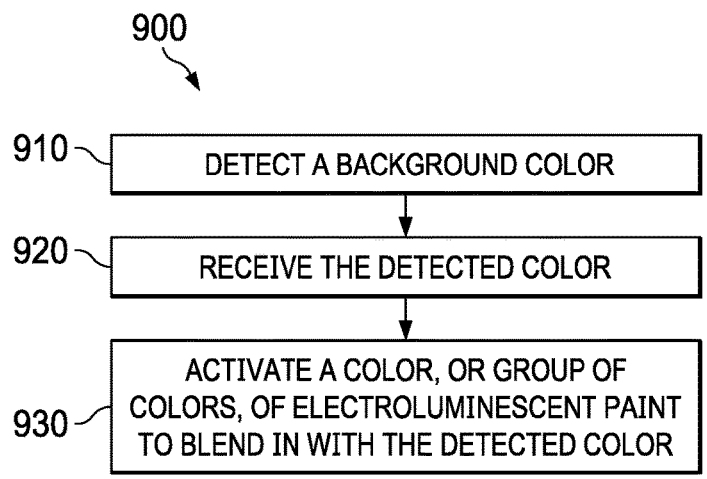
FIG. 9 is a flow chart of a method embodiment under the present disclosure.

FIG. 9 shows a method embodiment 900 under the present disclosure for operating an aircraft. At 910, a background color is detected. At 920, the detected color can be received at a processor. At 930, the processor activates a color, or group of colors, of electroluminescent paint to blend in with the detected color. The activated color(s) may be located on an opposite side of the aircraft to where the background color was detected. An aircraft under the present disclosure may not be able to perfectly match a detected background color. But by activating a similar color, or mix of available luminescent paint colors, the aircraft may be able to achieve some beneficial camouflaging effect.

Figure 10:
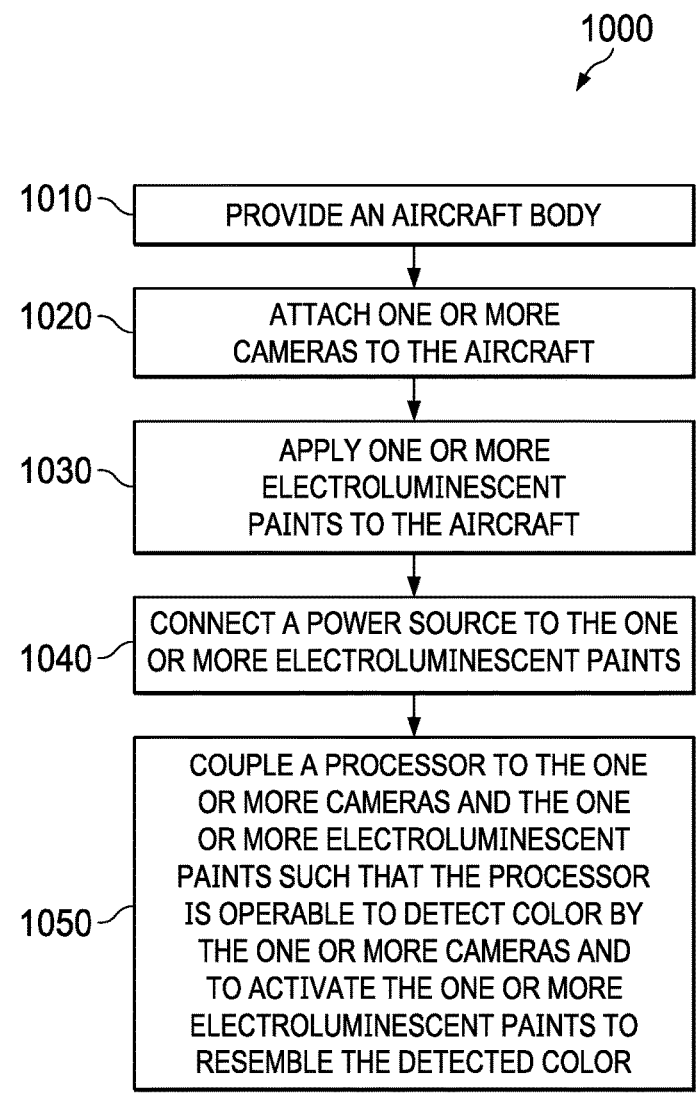
FIG. 10 is a flow chart of a method embodiment under the present disclosure.

FIG. 10 shows a method embodiment 1000 under the present disclosure for manufacturing an aircraft. At 1010, an aircraft body is provided. At 1020, one or more cameras are attached to the aircraft. At 1030, one or more electroluminescent paints are applied to the aircraft. At 1040, a power source is connected to the one or more electroluminescent paints. At 1050, a processor is coupled to the one or more cameras, the power source, and the one or more electroluminescent paints, such that the processor is operable to detect color via the one or more cameras and to activate the one or more electroluminescent paints to resemble the detected color.

Embodiments have been described that help an aircraft blend in or camouflage itself. However, electroluminescent paint can be used in situations where it is desired that an aircraft be more visible. Possibly bright colors can help an aircraft be spotted when desired. There may be safety reasons, or to provide assistance in rescue missions. The embodiments described herein could be adjusted to provide for greater visibility when a user desires.

Embodiments have been described using electroluminescent paint. Electroluminescent tapes can also be used to accomplish similar functionality. A variety of adhesives or coatings with electroluminescent qualities can be used under the preset disclosure. Combinations of the foregoing are also possible. Some portions of an aircraft may work better with tape, and others may work better with paint. For example, cockpit windows or other areas of an aircraft may work better with tape or paint. Tape or other sticker type covers may allow for greater temporary variability. An aircraft may use tape for a jungle mission that comes in olive and brown. A later mission may include flying against blue and cloudy skies. The olive and brown tape can be removed and gray and blue tape applied.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A cloaking system for an aircraft, comprising:
(a) a first electroluminescent paint pattern applied to at least a portion of a first side of the aircraft such that the first electroluminescent paint pattern faces in a first direction, the first electroluminescent paint pattern comprising a repeating pattern of first, second, and third stripes having a first, second and third color, respectively, wherein the first stripes intersect with each other such that the first stripes are configured to be powered together with each other, wherein the second stripes intersect with each other such that the second stripes are configured to be powered together with each other, wherein the third stripes intersect with each other such that the third stripes are configured to be powered together with each other, wherein the first, second and third stripes are configured to be powered independently of each other;
(b) a second electroluminescent paint pattern applied to at least a portion of a second side of the aircraft such that the second electroluminescent paint pattern faces in a second direction opposite the first direction, the second electroluminescent paint pattern comprising a repeating pattern of fourth, fifth, and sixth stripes having the first, second and third color, respectively, wherein the fourth stripes intersect with each other such that the fourth stripes are configured to be powered together with each other, wherein the fifth stripes intersect with each other such that the fifth stripes are configured to be powered together with each other, wherein the sixth stripes intersect with each other such that the sixth stripes are configured to be powered together with each other, wherein the fourth, fifth, and sixth stripes are configured to be powered independently of each other;
(c) a first camera facing in the first direction such that the first camera is configured to detect a first background color in the sky on the first side of the aircraft;
(d) a second camera facing in the second direction such that the second camera is configured to detect a second background color in the sky on the second side of the aircraft and different from the first background color;
(e) one or more power sources configured to supply power to the first and second electroluminescent paint patterns; and
(f) a processor coupled to the first and second electroluminescent paint patterns, the first and second cameras, and the one or more power sources, the processor configured to receive a notification of the first background color on the first side and to adjust the second electroluminescent paint pattern to resemble the first background color, the processor further configured to receive a notification of the second background color on the second side and to adjust the first electroluminescent paint pattern to resemble the second background color independently of the second electroluminescent paint pattern.

2. The cloaking system of claim 1, wherein the first, second, and third colors are blue, white and gray.

3. The cloaking system of claim 1, wherein the first and second cameras comprise photosensitive diodes.

4. The cloaking system of claim 1, wherein the first and second cameras comprise high-definition cameras.

* * * * *